May 20, 1952 S. E. KAPPE 2,597,802
APPARATUS FOR TREATING LIQUID SEWAGE AND THE LIKE
Filed July 17, 1946 6 Sheets-Sheet 1

Inventor
Stanley E. Kappe
By Lloyd W. Patch
Attorney

May 20, 1952 S. E. KAPPE 2,597,802
APPARATUS FOR TREATING LIQUID SEWAGE AND THE LIKE
Filed July 17, 1946 6 Sheets-Sheet 2

Inventor
Stanley E. Kappe
By Lloyd W. Patch
Attorney

May 20, 1952 S. E. KAPPE 2,597,802
APPARATUS FOR TREATING LIQUID SEWAGE AND THE LIKE
Filed July 17, 1946 6 Sheets-Sheet 3

Inventor
Stanley E. Kappe
By Lloyd W. Patch
Attorney

May 20, 1952 S. E. KAPPE 2,597,802
APPARATUS FOR TREATING LIQUID SEWAGE AND THE LIKE
Filed July 17, 1946 6 Sheets-Sheet 4

May 20, 1952 S. E. KAPPE 2,597,802
APPARATUS FOR TREATING LIQUID SEWAGE AND THE LIKE
Filed July 17, 1946 6 Sheets-Sheet 5

Inventor
Stanley E. Kappe
By Lloyd W. Patch
Attorney

May 20, 1952 S. E. KAPPE 2,597,802
APPARATUS FOR TREATING LIQUID SEWAGE AND THE LIKE
Filed July 17, 1946 6 Sheets-Sheet 6

Inventor
Stanley E. Kappe
By Lloyd W. Patch
Attorney

Patented May 20, 1952

2,597,802

UNITED STATES PATENT OFFICE 2,597,802

APPARATUS FOR TREATING LIQUID SEWAGE AND THE LIKE

Stanley E. Kappe, Yorktowne, Md.

Application July 17, 1946, Serial No. 684,158

7 Claims. (Cl. 210—8)

My invention relates to apparatus for treating liquid sewage and the like, and particularly to apparatus and a method intended and adapted for use in treating domestic sewage and other like sewage, or liquid wastes, or other liquid containing or having suspended therein solid material such as raw or untreated waste or solids; and, although intended more particularly for use in connection with sewage treatment, which requires aeration followed by sedimentation, it is to be understood that the present invention is not confined to this use alone.

The primary object of the present invention is to provide apparatus for and the method of treating liquid sewage and other solids-carrying liquid, somewhat after the manner of the "activated sludge" process of sewage treatment; but with apparatus of relatively simple and inexpensive construction capable of being operated at minimum cost and maintenance expense, and with a method or process which accomplishes and insures more complete and effective treatment of the liquid suspended solid material and more effective and uniformly satisfactory treatment of the entire quantity of material.

Another object is to provide apparatus which can be installed in a space relatively smaller than heretofore considered practicable for a successful sewage or liquid treatment plant, and apparatus which will not require a plurality of receiving and settling and other liquid containing tanks, with pumps or other means and expensive piping and valve systems to convey and propel the liquid from one tank to another.

Still another purpose is to provide apparatus including an aeration tank in combination with sedimentation tank area which will reduce the cost of construction and operation of the installation as an activated sludge plant, by eliminating the additional aerating equipment and the requirement for channels, as well as eliminating the seed sludge return pump together with the necessary connecting piping and valves and other parts, and also the measuring and control devices formerly needed for installation and operation of such plants as heretofore installed and used.

A further purpose of the present invention is to provide an aeration tank in combination with a settling tank so that the sludge which settles to the bottom of the settling tank can be moved to the aeration tank with a simple installation of mechanical scrapers, while at the same time the seed sludge can be moved to the aeration tank without the use of mechanical scrapers.

Yet another object of this invention is to provide apparatus and a method to utilize the air energy normally heretofore used only for aeration, to agitate, and mix the seed sludge and the incoming flocs, and to also perform the functions of positively moving and returning the seed sludge from the final settling tank to the aeration tank, whereby the aerating means not only serves functions normally performed, but will also obviate the need of installation of return seed sludge pumps and other appurtenances and apparatus which must be installed and furnished when return seed sludge pumps are employed.

Another object is to provide for distribution or discharge of sewage into the aeration tank along its entire length, to introduce the seed sludge likewise along the entire length, or at frequent intervals throughout the length of the aeration tank, in consequence of which the rate of oxygen demand throughout the entire tank will be relatively low, and the operation of my apparatus and the carrying out of my method will require less air than has heretofore been normally used.

Still another object of this invention is to provide an aeration tank in combination with a settling tank so that the aerated mixture will flow from the aeration tank to the settling tank, in large sewage plants as well as small sewage plants, with a minimum loss of hydraulic head, this arrangement and system being particularly advantageous in some installations to eliminate the use of pumps which otherwise may be required to pump and force the incoming sewage flow.

Another purpose of this invention is to provide for return of seed sludge to the aeration tank in a time materially shorter than normally possible, to thus maintain the seed sludge in a very fresh and active condition with the highest purifying powers possible, and with the sludge mixture containing at all times dissolved oxygen for supporting bacterial life.

With the above and other objects in view, some of which will be apparent to those skilled in the art, and others of which are inherent in the use of my improved apparatus and the carrying out of my new methods, this invention includes such novel features of construction and combinations and arrangements of parts, as well as certain novel procedures and steps of procedure employed in carrying out the method, which will be hereinafter set forth in connection with the drawings and then pointed out in the claims.

When sewage containing a suitable supply of dissolved oxygen is agitated for a period of time, the organic material in the sewage will gather and form brownish flocs, and if the sewage thus coagulated is allowed to stand quiescent, the flocs will settle to the bottom thus leaving a clear liquid on the top. These flocs contain a large number of bacterial life, and are commonly known in sewage practice as "activated sludge." When such flocs are introduced into raw sewage or settled sewage, the oragnic material therein is more rapidly coagulated. The activated sludge introduced into the sewage is commonly known as "seed sludge" or "return activated sludge."

The effluent from the aeration tanks containing these brownish flocs in suspension is conveyed to a subsequent tank known as the "final settling tank," wherein the activated sludge coagulates and settles to the bottom, leaving a clear supernatant liquid or purified effluent which is discharged into the receiving stream without creating any public health nuisance or menace.

In the activated sludge process, raw sawage or settled sewage, that is, sewage from which the readily settleable solids have been removed, is conveyed to the aeration tank wherein the sewage is agitated, mixed and aerated with seed sludge continuously introduced into the incoming sewage flow or aeration tank from the final settling tank. The bacteria-like organisms which the seed sludge contains are the purifying organisms. Mechnical vane type pumps of the upflow and downflow types and compressed air are used to mix thoroughly the sewage and the seed sludge and at the same time supply atmospheric oxygen to support the bacterial life.

The activated sludge process requires that a certain amount of seed sludge, normally 25% and often higher than 40% of the flow to be purified, be returned and be introduced either into the incoming sewage or aeration tank receiving the sewage, and the remainder is wasted and disposed of elsewhere.

This seed sludge is pumped continuously from the final settling tank, normally to a channel carrying the incoming sewage flow to the aeration tank. Pumping is costly, not only in power consumption and maintenance and repairs, but also due to the fact that it necessitates the installation of costly equipment such as pumps, piping, valves, measuring and control devices, and necessitates larger housing structures, more land, and additional aeration equipment which must be installed in channels conveying the mixture of seed sludge and sewage to the aeration tank and the channel carrying the mixture therefrom to the final settling tank. This additional aeration equipment is required and, therefore, larger blowers must be used and additional power is consumed because the activated sludge has a strong demand for oxygen and must be aerated and kept in suspension at all times to maintain active bacterial life and its purifying activity.

A disadvantage in the use of the present apparatus and method is that the aeration tank effluent enters the final settling tank at one end or at the center, and the purified liquor is taken off at the far end or the periphery. Mechanical scrapers are used to remove the sludge which settles to the bottom to a sump where the seed sludge pump takes suction. The holding capacity of the final settling tank is normally two and one-half hours, in order to secure effective settling of the fine flocs. The long period of treatment and holding which elapses from the time the activated sludge mixture leaves the aeration tank, enters the settling tank, settles to the bottom thereof, is moved by scrapers to the sump at one end or at the center of the settling tank, and is then pumped through pipelines and measuring devices is too long a gap until the seed sludge reaches and is discharged into the incoming sewage flow or aeration tank. During this entire period, the seed sludge is not supplied sufficient oxygen to support bacterial life. As a consequence, the activity and purifying powers of the organisms are lessened or destroyed, and the liquor often becomes septic. This condition has been responsible for the failure of many activated sludge plants and periodic upsets in the activated sludge process in many other plants which cause a degree of treatment lower or less than required to prevent public health menaces and nuisances in the receiving river or stream into which the final liquor is discharged.

Another disadvantage of present-day apparatus and methods is that the seed sludge is normally mixed with the incoming sewage at one end of the aeration tank. As a consequence, biological activity is greatly stimulated and the organisms have a high rate of demand on the dissolved oxygen in the mixture of seed sludge and sewage. This high rate of oxygen demand exists at the inlet end and progressively tapers off toward the far end of the aeration tank. As a result, although a large quantity of air is used at the inlet end, more air is used at the far end, and generally the remaining half of the aeration tank then is necessary to support bacterial life, but such excess air must be supplied to keep the activated sludge in suspension. More air is required because the important factor is agitation and circulation to keep the sludge in suspension, as otherwise it would settle to the bottom and become septic.

The present invention relates to apparatus for and the method of treatment of solids-bearing or other liquid, and although intended more particularly for use in connection with sewage treatment which requires aeration followed by sedimentation, it is to be understood that my invention is not confined to this use alone. However, in order that this description may not be unnecessarily verbose, this invention will be described in connection with its application to apparatus and a method capable of employment in the activated sludge process of sewage treatment. In the embodiment of the invention illustrated in Figures 1 and 2 of the drawings, the tank structure is generally polygonal or rectangular, being outlined and defined by a side wall 1 and having a bottom wall 2. Division walls or partitions 3 and 4 divide the generally rectangular form into a middle settling tank 5 and the aeration tanks 6 and 7 on opposite sides of the settling tank 5. Liquid sewage is supplied through conduits 8 and 9, and spills over weirs 10 and 11 into the aeration tanks 6 and 7. These conduits 8 and 9, and the weirs 10 and 11, are constructed so that the liquid sewage can be discharged into the aeration tanks along their entire length, or at frequent and desired intervals or points along the aeration tanks. The settling tank 5 has the bottom 12 thereof elevated somewhat above the bottom 2 of the aeration tank, and communication is established for the flow of liquid from the two aeration tanks 6 and 7, through passages 13 and 14 provided through the walls 3 and 4 at an elevation above the bottom 12 of the settling tank. The level of liquid in the settling tank 5 and the aeration tanks 6 and 7 is determined, in the present instance, by the height of the side walls 15 of effluent channel or conduit 16, which extends preferably substantially down the middle of the settling tank 5.

Figure 1:
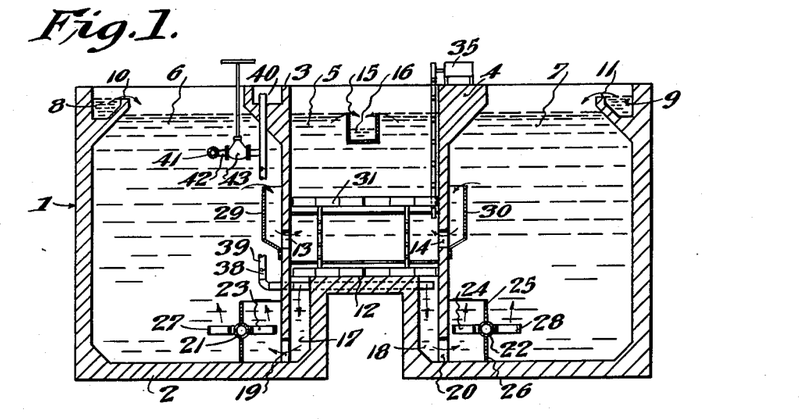
Figure 1 is a transverse vertical sectional view taken through an apparatus embodying an adaptation of my invention.
Figure 2:
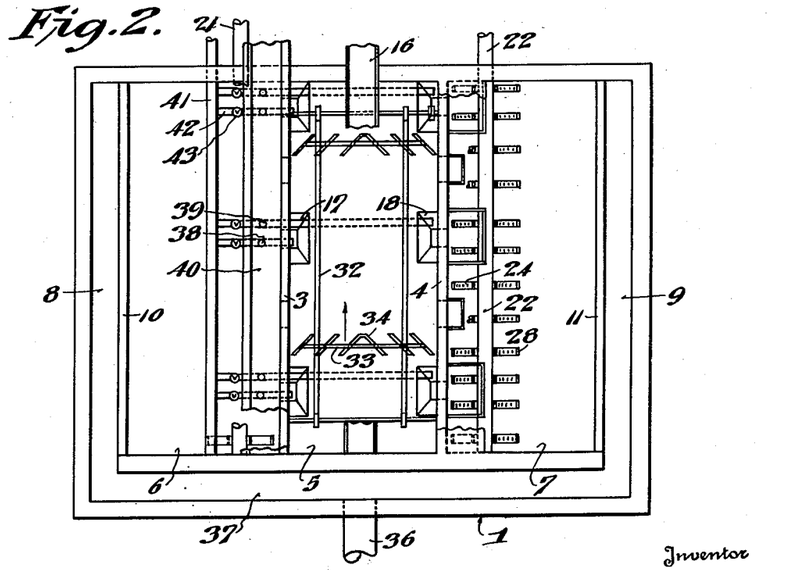
Fig. 2 is a top plan view of the disclosure in Figure 1.

Conduits 17 and 18 are provided through the bottom 12 of the settling tank, on opposite sides thereof, and openings 19 and 20 establish communication from said conduits 17 and 18 into the aeration chambers 6 and 7, near the bottom of these chambers. Air or oxygen supply headers 21 and 22 are provided in the aeration tanks 6 and 7 adjacent to the openings 19 and 20 from the conduits 17 and 18; and these headers 21 and 22 have a plurality of diffuser branches 23 and 24 extending laterally adjacent to the openings 19 and 20, these diffuser branches being preferably provided with a plurality of air escape openings through which diffusing and aerating and agitating air is supplied. If desired, baffles 25 and 26 can be provided above and below the air or oxygen supply headers 21 and 22, and the diffusers 23 and 24 will then serve and will function as positive air lift means.

If it be found that diffusers 23 and 24 do not supply adequate oxygen, due to the strength of the liquid sewage being treated, diffusers 27 and 28, similar to the diffusers 23 and 24, can be provided on the outer side of the air or oxygen supply headers 21 and 22, to provide and furnish additional oxygen requirements. The conduits 17 and 18 can be made substantially continuous along the side walls at the bottom of the settling tank 5, or these conduits can be provided at suitably spaced apart intervals, as is shown in Fig. 2 of the drawings. Also, the openings 19 and 20 can be made continuous or can be provided at suitable and desired spaced apart points. Further, the openings 13 and 14 from the aeration tanks 6 and 7 into the settling tank 5 can be made substantially continuous or can be a spaced apart series of openings. Since the air lift from diffusers 23 and 24 is substantially directly below the openings 13 and 14, it is perhaps desirable that baffle walls 29 and 30 be provided over these openings 13 and 14, with the tops of the baffles 29 and 30 open to permit free flow of aerated liquid from the aeration tanks 6 and 7 through openings 13 and 14 into settling tank 5.

A mechanical sludge scraper, generally indicated at 31, is provided in the bottom of the settling tank 5 to scrape settled sludge from the bottom 12 of the settling tank and move this sludge forwardly and laterally to be deposited in the conduits 17 and 18. In the present instance, I have illustrated a scraper structure made somewhat after the manner of a belt or chain continuous conveyor or scraper mechanism. The belts or chains 32 have crossbars 33 thereon carrying scraper shoes 34, and a motor 35, or other suitable power means is provided to cause the scraper structure to be moved, substantially in the direction indicated by the arrow in Fig. 2, so that the scraper blades 34 will move the deposited sludge laterally upon the bottom 12 of the settling tank 5, to be deposited in conduits 17 and 18.

In the present disclosure, I have illustrated a liquid sewage supply pipe 36, discharging into a conduit 37, which in turn conducts the liquid to the supply conduits 8 and 9. As best shown in Fig. 2, the effluent channel 16 can be extended outside of the tank structure 1, to convey and discharge the clear liquor at any desired location.

In the use of this apparatus, and in carrying out the process of my invention, the liquid sewage is supplied through pipe 36 and is conveyed by conduit 37 to the conduits 8 and 9, where the solids-containing liquid sewage is spilled over the weirs 10 and 11 into the aeration tanks 6 and 7. The air supplied through diffuser pipes 23 and 24 will cause circulation of the liquid within the aeration tanks 6 and 7, to keep the solids in suspension therein, and at the same time will supply the necessary oxygen. The air supply can be directly from the headers 21 and 22, and this constitutes an air diffusion system, with the baffles 25 and 26 creating a hydraulic differential circulating the liquid and suspended matter. Thus, the light and heavy flocs, and solids within the liquid sewage are kept in suspension, and a portion of this liquid will flow through the openings 13 and 14 into the settling tank 5. In this settling tank 5, the liquid will be more quiescent, and the sludge will settle to the floor 12 of the settling tank. Necessary quantities of seed sludge will move from the settling tank 5 through conduits 17 and 18 and openings 19 and 20, to be returned to the aeration tanks 6 and 7. As the sludge settles to the bottom or floor 12 of settling tank 5, the clear liquor spills over the wall 15 into the effluent channel or conduit 16, to be discharged at any desired location.

Motor 35, or other power means, will cause operation of the scraper structure 31 to remove the settled sludge from the bottom or floor 12 of the settling tank 5 and scrape this sludge into the conduits 17 and 18.

In order to maintain the seed sludge and suspended solids in aeration tanks 6 and 7 in desired proportions and quantities, excess sludge is removed preferably at the point of greatest concentration, or in other words, preferably at the intake end of conduits 17 and 18. Sludge removal pipes 38 and 39 have their intake end in communication with the upper part of the conduits 17 and 18, and these sludge removal pipes are extended to discharge into conduit 40 which conveys the waste sludge to any desired place for disposal. Obviously, various means may be employed to accomplish and accelerate movement of the sludge through pipes 38 and 39 to the conduit 40, and in the present instance I have conventionally shown connections by which air is supplied to the pipes 38 and 39 to accomplish air lift and conveyance of sludge. Such air lift apparatus is well known, and no attempt is here being made to disclose the detailed structure. Air under pressure can be supplied through air main 41, having branches 42 extending to and supplying air into sludge withdrawal pipes 38 and 39, and such air lift means as may be employed. As illustrated in Fig. 2, it is perhaps preferable that sludge removal pipes be provided at various points along the length of the settling tank 5, if a continuous length of conduit be provided on each side, at 17 and 18, or that sludge removal pipes be provided for each of the spaced apart series of conduits 17 and 18. Since it may be found desirable to control the sludge removal through the several pipes 38 and 39, air control valves 43 are preferably provided in the air branch line 42. Since the conduits or sludge removal pipes 38 and 39 take the waste sludge at the point at which it is most concentrated, this will cut down on the required size of concentration tank that may be provided to concentrate the waste sludge before it is disposed of into a digester, or elsewhere.

In the illustration in Figs. 1 and 2, and in the foregoing description, I have disclosed the settling tank 5 as located substantially centrally between two aeration tanks 6 and 7, with the two aeration tanks functioning in substantially identical manner. If desired, and in some installations, one aeration tank and one settling tank can be used. In such an installation, the structure and the operation would be substantially identical with one-half of the apparatus as disclosed in Figs. 1 and 2, and since the construction and the functioning of such an apparatus will be readily apparent to one skilled in the art, no attempt is here made to include additional drawings or detail description of single aeration tank adaptation.

Figure 3:
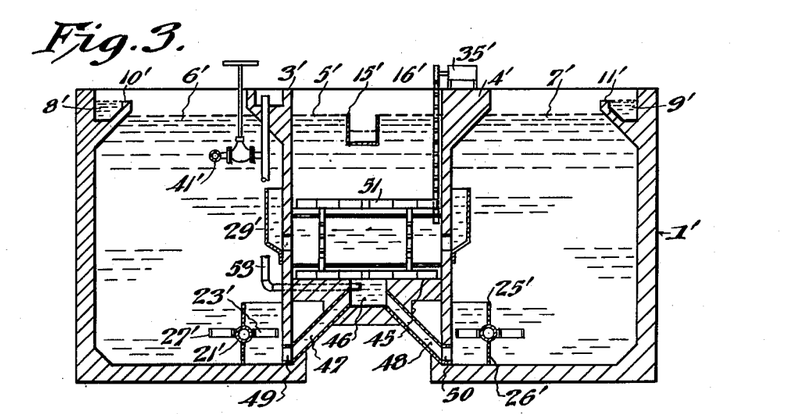
Fig. 3 is a vertical transverse sectional view disclosing another adaptation of the invention in a rectangular arrangement.
Figure 4:
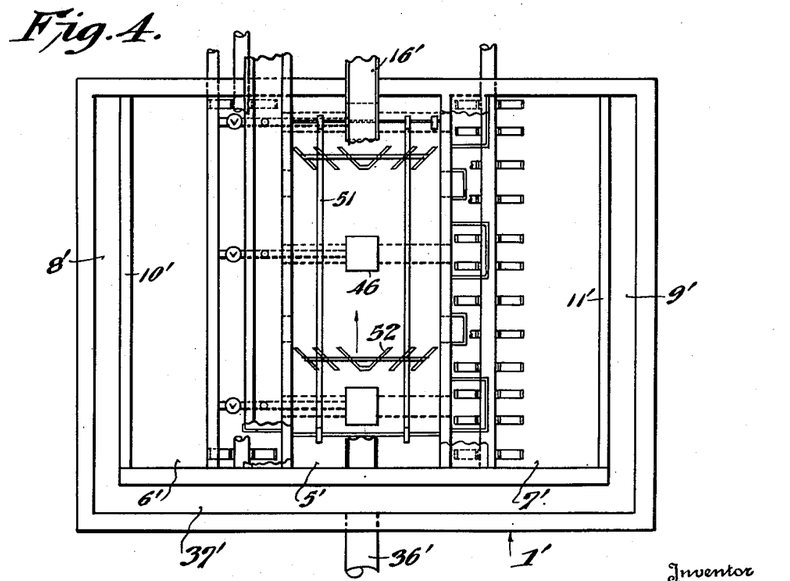
Fig. 4 is a plan view of the showing in Fig. 3.

In the modified embodiment of the invention illustrated in Figs. 3 and 4 of the drawings, the apparatus is of construction and arrangement quite similar to that described in detail in connection with Figs. 1 and 2 of the drawings, and many of the parts are substantially duplicated. To avoid repetition of description of the parts, the duplicate parts and structure of Figs. 3 and 4 have reference characters applied thereto carried over from Figs. 1 and 2; and, to avoid confusion, the reference numerals thus carried over have been distinguished and identified on Figs. 3 and 4 by the addition of a prime sign. Therefore, for complete and detailed identification of the duplicated parts as contained in Figs. 3 and 4, it is only necessary to refer to the detail description of the structure of Figs. 1 and 2, and to then read each of the identifying reference characters of the description of Figs. 1 and 2 as having a prime sign appended thereto, to thus identify and distinguish the corresponding parts in the modified disclosure of Figs. 3 and 4.

The aeration tanks or chambers 6' and 7' are on opposite sides of the settling tank or chamber 5', and the bottom 45 of the settling tank is in the present instance shown as continuing substantially over to the dividing walls 3' and 4'. This wall or floor 45 has a sump 46 formed or provided substantially on the longitudinal center. While the sump 46 might be continuous throughout the length of the settling tank 5', I have here illustrated a spaced series of several sumps throughout the length of the settling tank. Be there one or several sumps 46, conduits 47 and 48 will lead therefrom to discharge through openings 49 and 50 into the aeration tanks 6' and 7'. The sludge scraper 51 is quite similar to the sludge scraper 31, but in this instance the scraper blades 52 are so constructed that they scrape the settled sludge from the bottom or floor 45 and move the sludge toward the center to be discharged into the several sumps, or the single sump, 46. A sludge withdrawal pipe 53, similar to sludge withdrawal or removal pipes 38 and 39, leads to the sump 46, to have its intake end within this sump so that it will take the waste sludge at the point at which it is most concentrated. With this modified embodiment of the invention, the operation will be carried out and treatment will be substantially the same as has been set forth at length in connection with the apparatus illustrated in Figs. 1 and 2 of the drawings.

With the apparatus as heretofore described, the air not only aerates the liquid sewage within the aeration tank, but also diffuses and circulates the liquid sewage, thereby securing positive movement of light and heavy sludge flocs, pulls the sludge from the settling tank, mixes the seed sludge, supplies oxygen to promote and support bacterial growth, and in general creates and maintains aeration, circulation, and general treatment and flow of the liquid to accomplish and maintain efficient operation and functioning of the apparatus, and to successfully and efficiently carry out the process of this invention. The baffles 25 and 26 create a hydraulic differential that accomplishes circulation of the liquid and suspended matter, and also the settled matter, in desired manner and with force to withdraw a part of the matter from the settling chamber or tank.

In some instances, it may be found that one or both of the baffles 26 and 25 can be dispensed with; and, a greater or lesser number of diffuser air supply pipes can be employed or the headers 21 and 22 can directly supply and diffuse air. However, use of a multiplicity of diffuser air supply pipes, and employment of the baffles, substantially as illustrated, may be found necessary or desirable to secure and maintain a hydraulic differential for positive movement of light and heavy sludge and flocs, and to insure diffusion and circulation and a proper supply of oxygen to the liquid sewage.

Figure 5:
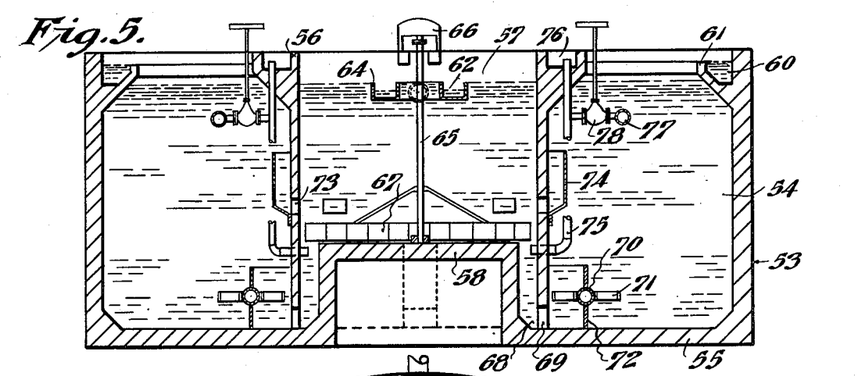
Fig. 5 is a central vertical sectional view through a modified form of apparatus generally circular in plan.
Figure 6:
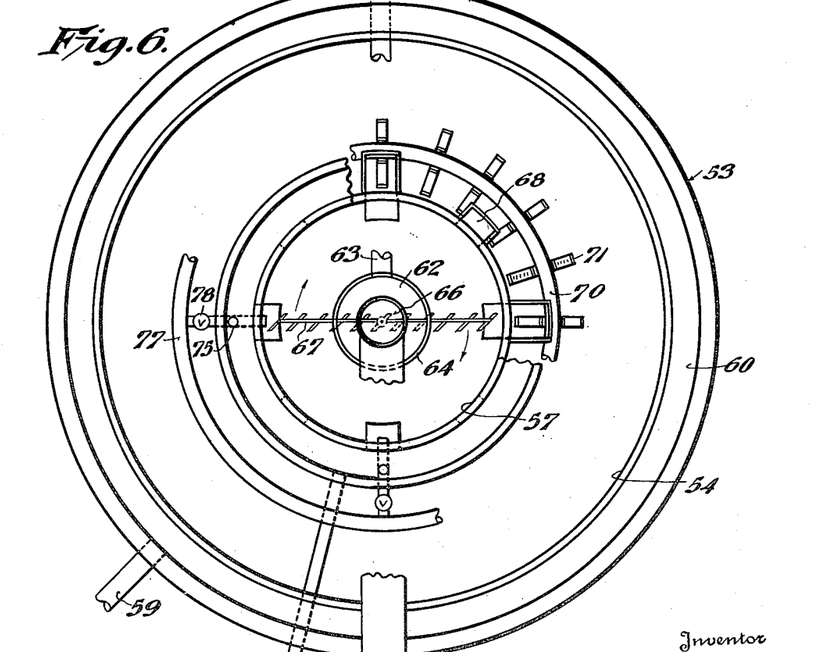
Fig. 6 is a view looking down on Fig. 5 and with part broken away.

With the modified embodiment of my invention as illustrated in Figs. 5 and 6, a circular settling tank is provided, and this settling tank or chamber is substantially concentrically surrounded by a circular aeration tank or chamber. An outer wall structure 53 is generally circular in plan, and, with bottom wall 55, encloses and provides a substantially circular aeration tank or chamber 54. A circular wall 56 is provided substantially concentrically within and spaced from the outer circular wall 53, to thus divide off and provide a settling tank or chamber 57, this settling tank or chamber being located within and being substantially concentrically surrounded by the aeration tank or chamber 54. The settling tank or chamber is provided with an elevated bottom or floor 58.

Liquid sewage is supplied to this apparatus through supply pipe 59 emptying into a distributing conduit 60 provided around the inner side of the wall 53 adjacent to the top thereof and having a weir wall 61 over which the liquid sewage or influent is supplied to the aeration tank or chamber 54. A discharge conduit 62 and discharge pipe 63 are provided at the proper level, and preferably substantially centrally within the settling tank 57, so that the clear liquor or effluent will be discharged over the weir wall 64 into the discharge conduit 62, to be carried off by discharge pipe 63 to a receiving stream or other disposal stream.

A scraper shaft 65 is journaled substantially perpendicularly and substantially centrally within the settling tank 57, and this shaft 65, rotated by motor 66, has a scraper 67 on its lower end working adjacent to the floor or bottom 58 of settling tank 57. The scraper head 67 has the blades thereon angularly disposed so that as the scraper head is revolved or rotated, the sludge settled upon the bottom wall or floor 58 of the settling tank 57 will be moved outwardly toward the wall 56. One or several conduits 68 will be provided through the bottom or floor 58, adjacent to the wall 56, and openings 69 are provided to establish communication from the conduit 68 into the aeration chamber 54. A single annular conduit 68 can be provided, or several conduits can be employed in a spaced annular series, and it will be appreciated that a single opening 69 can be formed continuously around through the wall 56, or that an annularly spaced series of openings can be provided.

A substantially circular air supply header 70 is provided within the aeration tank 54, spaced outwardly around the wall 56 adjacent to the opening 69, and preferably elevated somewhat above the floor 55. A plurality of diffuser pipes 71 extend in branched relation from the header 70, and are provided with perforations or slits or other openings for discharge of aeration and diffusing and circulating and oxygen-supplying air into and through the liquid in the aeration tank 54. It may be found desirable to provide one or more baffles 72, to improve or influence the air lift and circulating forces exerted by the air.

Liquid circulation passages 73 are provided through the wall 56 to establish liquid circulating communication between the aeration tank 54 and the inside of the settling tank 57, and while I have illustrated an annularly spaced series of such openings 73, it will be appreciated that a continuous or substantially continuous single opening may be employed. Baffles 74 may be provided over the openings 73. The present apparatus will be used and will function substantially after the manner set forth in considerable detail above, and as the sludge settles to the bottom or floor 58 of the settling tank 57, this sludge will be scraped and will be discharged outwardly by the rotating or revolving scraper 67, to be discharged into the conduit 68, and to pass therefrom through the opening 69 into the aeration tank 54. To remove excess sludge, the sludge discharge pipes are provided with their intake ends opening substantially in the throat of the conduit 68 so that sludge can be discharged or withdrawn substantially at the point of the greatest concentration. It is perhaps preferable that a series of sludge discharge pipes 75 be provided, as in this way an even and distributed withdrawal of sludge can be accomplished, and sludge discharge pipes 75 lead to a sludge discharge conduit 76, from which conduit the discharged sludge can be conveyed to a digester, or elsewhere.

Various apparatus or means might be employed to withdraw and convey the excess sludge through the sludge discharge pipe 75, and in the present instance I have illustrated somewhat diagrammatically air lift means connected to the sludge discharge pipes 75, air being supplied through an air header 77, and the air being controlled by valve 78.

Figure 7:
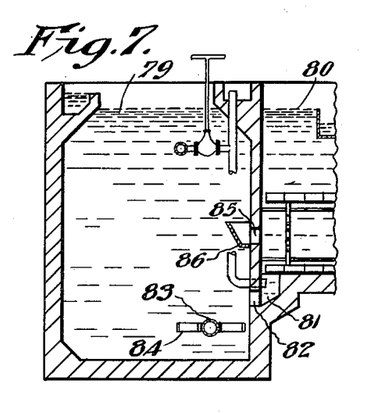
Fig. 7 is a fragmentary vertical sectional view showing another apparatus carrying out my invention.

With the embodiment of the invention illustrated in Fig. 7, the parts are quite similar to the showing in Figure 1, the aeration tank or chamber 79 corresponding substantially to the aeration tank 6, and the settling tank 80 being somewhat similar to the settling tank 5. The conduit 81 has its discharge opening 82 elevated somewhat above the bottom wall of the aeration tank 79, and the air supply header 83 is located somewhat below the level of the opening 82, so that the diffuser branches 84 will, in effect, discharge air to rise substantially perpendicularly across or adjacent to the opening 82.

The liquid flow opening 85 providing a liquid passage between the aeration chamber 79 and the settling chamber 80 is provided above the opening 82, and baffle 86 is disposed over the opening 85.

Figure 8:
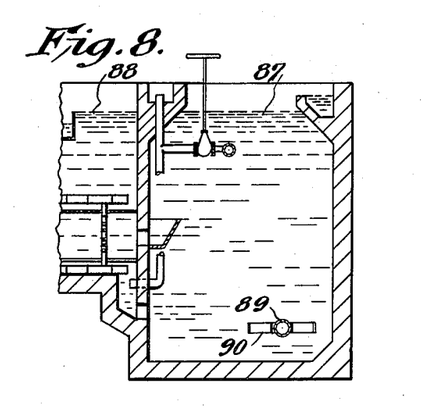
Fig. 8 shows a fragmentary vertical sectional view through another modified structure.

The form and the embodiment of the invention as disclosed in Fig. 8, the aeration tank or chamber 87, and the settling tank or chamber 88 are quite similar to the chambers 79 and 80 of the disclosure in Fig. 7. The air supply header 89 is disposed substantially in the outer lower corner of the aeration tank 87, and the diffuser air supply branches 90 are thus disposed somewhat away from the opening establishing communication to and from the two chambers 87 and 88. With this construction of the apparatus, the supply of air will cause diffusing and circulating coursing or flowing of the liquid in the aeration tank or chamber 87.

Figure 9:
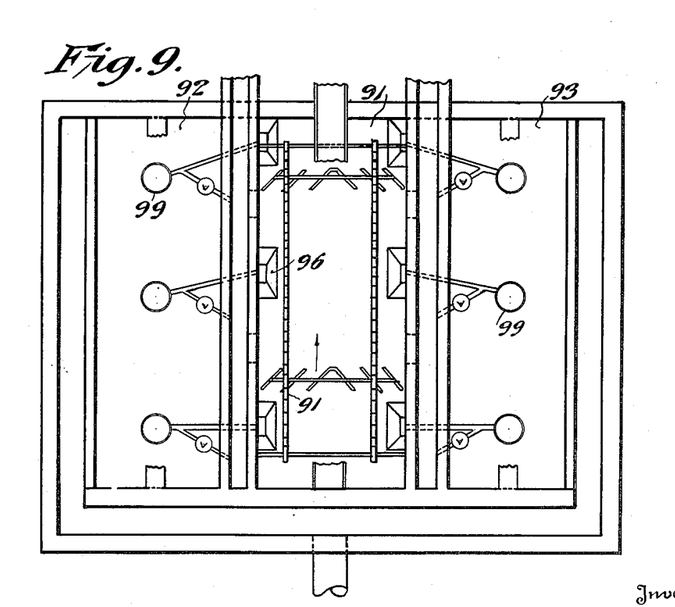
Fig. 9 illustrates in plan an apparatus including pump means.
Figure 10:
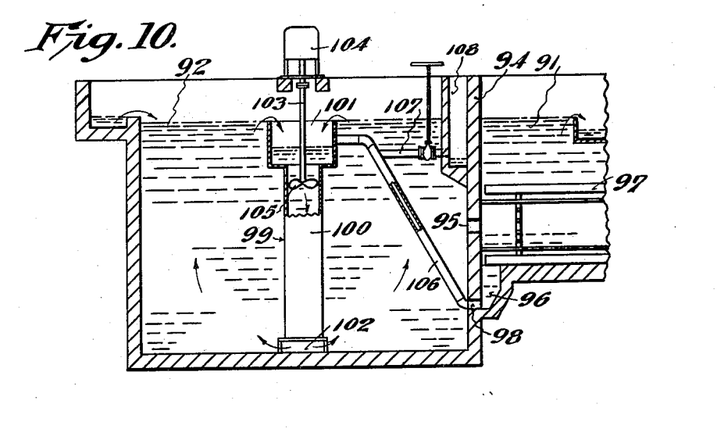
Fig. 10 is a fragmentary transverse vertical sectional view through parts of the showing in Fig. 9.

With the embodiment of the invention disclosed in Figs. 9 and 10, the settling tank 91 has aeration tanks or chambers 92 and 93 on opposite sides thereof. The main constructional parts are quite similar to the similar parts as contained in the disclosure of Figs. 1 and 2. The dividing wall 94 has liquid circulation opening 95 therethrough, preferably somewhat above the bottom of the settling tank or chamber, and conduits 96 are provided in position to receive the settled sludge as scraped thereinto by the scraper 97, an opening 98 being provided through the wall 94 at or adjacent to the bottom of the conduit 96. In this adaptation of my invention, a down-draft mechanical aerator 99 is provided in the aeration chamber. This down-draft mechanical aerator has an upright tubular body 100, with the upper end of this body enlarged to provide a widened-out liquid receiving bell 101. The body portion 100 is elevated or is otherwise mounted to provide a liquid circulation opening 102 at the lower end of this housing 100, and consequently low down in the aeration chamber or tank 92. A shaft 103 rotated by a motor 104 depends substantially centrally through the widened bell portion 101 and has its lower end within the opening of the body portion 100. A screw propeller 105, or other suitable agitating and liquid propelling means, is provided on the dependent end of shaft 103, and is so located and disposed that a down flow and down current of liquid will be accomplished in and through the tubular body portion 100. As indicated by the arrows, the course of down-draft mechanically forced circulation of the liquid will be downwardly through the body 100, and thence expanding or flowing outwardly through the opening 102 and into the chamber or tank 92. Return liquid and circulated liquid will flow over the upper edge of the bell 101, and the propeller 105 will create a sufficient mechanical down draft to maintain the liquid level within the bell 101 substantially lower than the liquid level in the aeration tank or chamber 92. A pipe leads from the opening 98 upwardly through the aeration chamber or tank 92, and has its upper end opening through the side wall of the bell 101. The seed sludge will move through pipe 106 into the bell 101, and will be circulated and mixed by the operation of the down draft mechanical aerated propeller 105. Aerating and oxygen supplying air can be introduced into the body of liquid within the aeration chamber or tank 92 in any desired manner. Excess sludge can be removed in any suitable manner, as for example through the pipe 107 discharging into the sludge discharge conduit 108. The use and operation of the above-described apparatus will be substantially the same as hereinabove set forth in considerable detail in connection with other embodiments, and the principal difference is in the employment of the down draft mechanical aerator 99.

Figure 11:
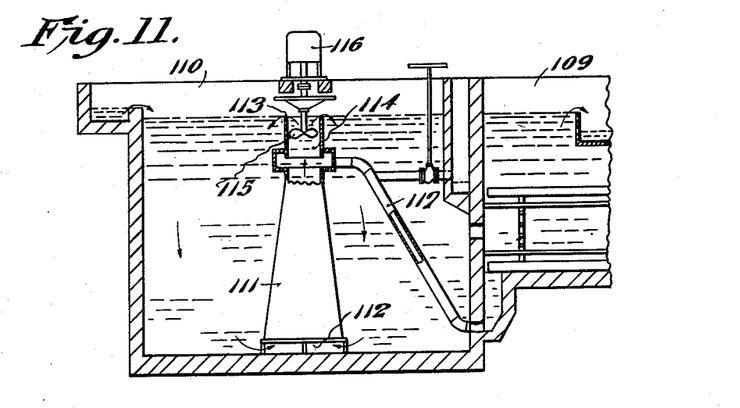
Fig. 11 is a sectional view similar to Fig. 10 illustrating a modified construction.

With the modified embodiment of the invention as disclosed in Fig. 11, the settling chamber or tank 109 is quite similar to the settling tank 91 of the showing in Fig. 10, and the aeration tank 110 is also quite like the aeration tank or chamber 92. The liquid supply, sludge conduits, sludge scraper, and other parts, are likewise similar to corresponding parts as shown and described in connection with Fig. 10. In this embodiment, I provide an updraft mechanical aerator 111 having a liquid intake opening at 112 and adapted to discharge liquid over the upper rim or weir edge at 113. This up draft mechanical aerator has a Venturi throat at 114, and a propeller 115, rotated by an electric motor 116, or other suitable power means, creates suction through the venturi, and circulates the liquid within the aeration chamber or tank 110. In this adaptation, the return sludge flows from the settling tank through a pipe or conduit 117 into the suction side of the mechanical aerator 111 at a point where a lower pressure exists due to the Venturi tube 114. Excess sludge can be removed in any desired manner.

With the embodiment of the invention disclosed in Figs. 9 and 10 and 11, oxygen is supplied to the liquid in the aeration tank by the mechanical aerator, and is thereby mixed and agitated. As shown in Fig. 9, several down draft mechanical aerators 99 are provided in each of the aeration tanks or chambers 92; and, it will be appreciated that a plurality of up draft mechanical aerators can be installed and employed in like manner.

Figure 12:
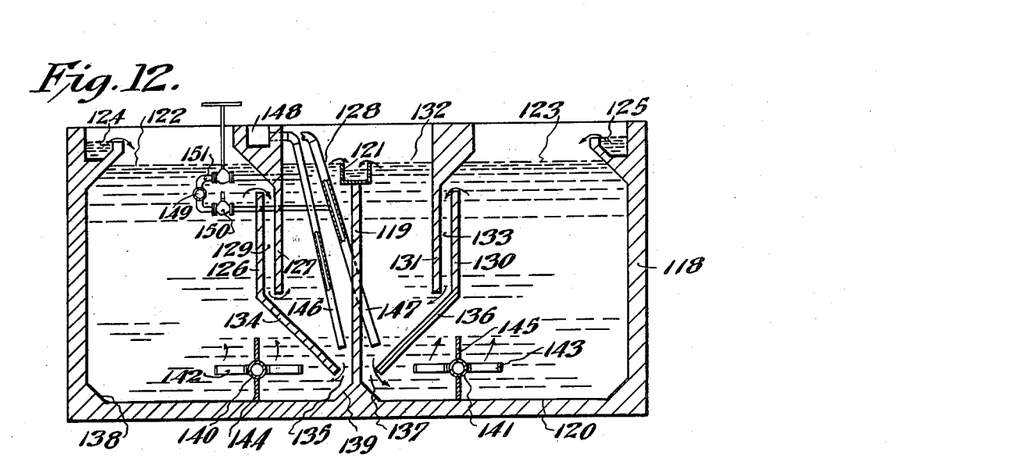
Fig. 12 shows a transverse vertical sectional view through another apparatus within the scope of my invention.

In Fig. 12 I have disclosed an embodiment and adaptation of my invention in apparatus in which the settling tank is divided into two sections, and in which the settling tanks or chambers are not provided with mechanical sludge scrapers. The outer wall structure 118 is preferably of polygonal or rectangular form when viewed in plan, and a middle dividing wall 119 is provided to extend upwardly from the bottom 120, and at its upper end supports the effluent discharge conduit 121. The wall 119 divides the apparatus into two substantially separate and individual units with the effluent discharge conduit 121 common to both. Aeration tanks or chambers 122 and 123 have the liquid sewage discharged thereinto over weir walls of the influent conduits 124 and 125. The staggered or offset walls 126 and 127 serve to divide off, within the aeration tank or chamber 122, a settling tank or chamber 128, with the offsetting or staggering of the walls 126 and 127 providing a liquid passage 129 between the chambers or tanks 122 and 123. Similar staggered or offset walls 130 and 131 divide off a settling tank or chamber space 132, with the staggering of the walls providing a liquid passage at 133. In this adaptation, the wall 126 has a downwardly inclined bottom wall extension 134, which at its lower end terminates in spaced relation with respect to the partition wall 119, to thus provide a sludge discharge passage 135. The wall 130 has an oppositely inclined bottom wall extension 136, which terminates in spaced relation with respect to the partition 119, thus leaving a sludge discharge passage 137. In this adaptation, mechanical scrapers are not provided, and the bottom wall extensions 134 and 136 are inclined downwardly at such angles that settling sludge will be directed downwardly thereover to flow by gravity toward and to the passages 135 and 137. It may be found desirable to provide fillets 138 and 139 in the bottom corners of the tanks or chambers 122 and 123; and, it will be appreciated that corners can be rounded or can be filleted in any and all such locations as may be found desirable. Air supply headers 140 and 141 are provided in the lower parts of the aeration tanks or chambers 122 and 123, and preferably adjacent to the bottom portions 134 and 136 of the settling tanks 128 and 132, so that the diffuser pipes 142 and 143 discharging air into the liquid within the aeration tanks will establish and maintain an air lift and agitation and mixing effect upon the liquid within the aeration tanks or chambers. If desired, baffles 144 and 145 can be provided to direct the air and liquid flow in desired pathways and create a positive hydraulic head differential within the aeration tank or between the aeration tank and settling tank at passageways 135 and 137.

In this embodiment of the invention, the highest concentration of sludge will be substantially immediately above and adjacent to the sludge passages 135 and 137, and seed sludge will find its way through both passages to be mixed with the liquid contents of the aeration tanks or chambers 122 and 123. As previously explained, where it is desired to remove excess sludge, this is best accomplished by withdrawing sludge at the point of greatest concentration, and with this in mind, I provide sludge withdrawal pipes 146 and 147 having their intake end located within the settling tanks or chambers 128 and 132, closely adjacent to the sludge outlet passages 135 and 137, these sludge discharge or withdrawal pipes 146 and 147 having their discharge end leading into a sludge discharge conduit 148. Air lift of sludge within the pipes 146 and 147 can be accomplished by the use of air supplied from air header 149, and the supply of air can be controlled through the medium of valves 150 in the air connecting line 151. The use and operation of the presently described adaptation will be quite similar to the use and operation and functioning of the previously described adaptations of my invention, with the exception that mechanical scraper means is omitted and the settled sludge will be discharged by liquid flow.

Figure 13:
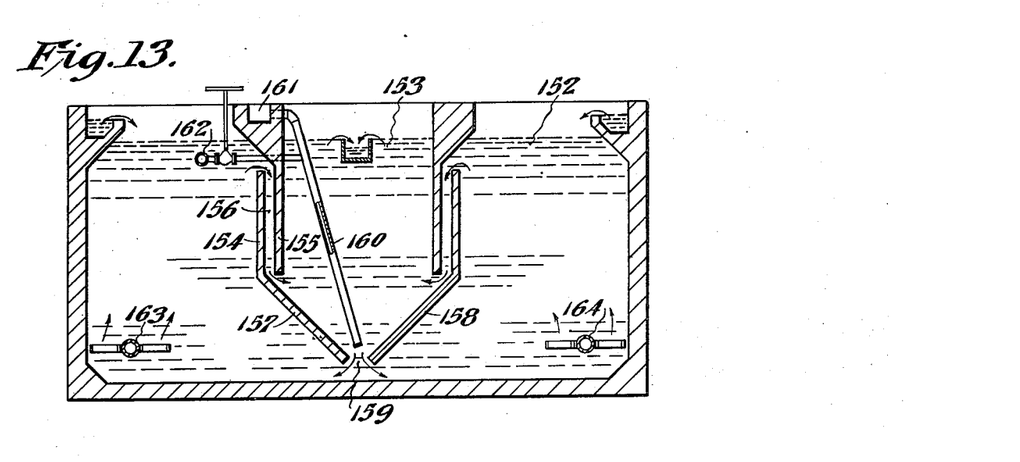
Fig. 13 is a sectional view similar to Fig. 12 and showing another embodiment of the invention.

With the modified embodiment of the invention as shown in Fig. 13, a substantially double aeration tank or chamber is provided at 152, and the single settling tank or chamber 153 is provided substantially centrally. The spaced apart or staggered walls 154 and 155 provide a liquid passage 156 therebetween through which the floc-carrying liquid can pass from the aeration tank or chamber 152 into the settling tank or chamber 153. The bottom of the settling tank is made up of the inclined wall portions or extensions 157 and 158, which terminate in spaced relation, to provide a sludge discharge passage 159. A sludge discharge or withdrawal pipe 160 has its intake end within the settling tank 153, preferably closely adjacent to the sludge discharge passage 159, where the concentration of sludge will be greatest; and, this pipe 160 leads to discharge into the sludge discharge duct or conduit 161. Air lift of sludge through the sludge withdrawal or discharge pipe 160 can be accomplished by the use of air from air header 162, substantially in the manner as above set forth. In some adaptations, it may be found desirable to provide the aerating and agitating air supply headers at points spaced outwardly and away from the sludge discharge passage 159, so that aerating and agitating air will be supplied therefrom to initiate and direct the circulation of the liquid adjacent to the outer walls.

The modified construction illustrated in Fig. 13 is adaptable for use and installation in a circular aeration tank or chamber, and in such adaptation the settling tank would also be preferably circular in plan.

In describing the several embodiments, I have set forth the use and functioning of the various parts. In thus describing the operation, I have more or less set forth the method or process steps. However, in order that the various steps and procedures may be perhaps better understood, my improved method of treating liquid sewage is carried out in apparatus having aeration and settling tanks, and consists of supplying the liquid sewage into the aeration tank, discharging aerating and agitating air into the liquid in the aeration tank, passing a quantity of the aerated liquid to the settling tank for settling of sludge, removing a part of the settled sludge, and returning this part to the aeration tank as seed sludge, and withdrawing excess settled sludge.

While I have herein shown and described only certain specific embodiments of my invention and have set forth only certain possible modifications of the structure, as well as certain steps and procedures employed in the carrying out of the method, it will be appreciated that many changes and variations can be made in the form and construction and association of the parts, and in the manner of using the equipment and the steps employed to accomplish my method, without departing from the spirit and scope of my invention.

I claim:

1. Sewage treatment apparatus comprising adjacent aeration and settling chambers, a liquid return passage from the aeration chamber to the settling chamber at an elevation above the bottom, a passageway from the lower part of the settling chamber to the aeration chamber, baffle means rising and extending upwardly from the bottom in the aeration chamber and spaced from the outlet opening of the passageway thereinto, and air discharge means in the aeration chamber and intermediate the outlet opening and the baffle means.

2. Sewage treatment apparatus comprising adjacent aeration and settling chambers, means to supply influent to the aeration chamber, means to remove effluent from the settling chamber, a liquid flow passageway from the aeration chamber to the settling chamber, a passageway from the settling chamber to the aeration chamber near the bottom thereof, air diffusion means in the aeration chamber, baffle means upstanding from the bottom of the aerating chamber adjacent to and spaced from the opening of the passageway thereinto, air supply means on the passageway side of the upstanding baffle discharging air into the aeration tank thereby creating hydraulic head differential between the baffle and the passageway from the settling tank and causing flow from the aeration chamber to the settling tank, means to collect material deposited in the settling tank and means to convey and discharge the settled material laterally or from the lateral walls toward the middle portion of the bottom of the settling tank to a passageway conveying material from the settling chamber into the aeration tank.

3. Sewage treatment apparatus comprising a settling tank between two aeration tanks, means to supply liquid sewage to the aeration tank, sumps in the bottom of the settling tank at each side thereof having openings into the respective aeration tanks, mechanical scraper means moving settled material on the bottom of the settling tank and discharging the material through the sumps, baffles upstanding from the bottom of each aeration tank adjacent to and extending above the opening thereinto, and means supplying air in the aeration tanks adjacent to the baffles creating suction through the openings and mixing, aerating and circulating the mixture and concurrently causing flow through said sumps from the settling tank to the aeration tanks and through the passageways from the aeration tanks to the settling tank.

4. Sewage treatment apparatus comprising a settling tank between two aeration tanks, means to supply liquid sewage to the aeration tank, a sump in the middle portion of the bottom of the settling tank having passageways leading to the two aeration tanks, mechanical scraper means moving settled sludge on the bottom of the settling tank from the lateral walls to the sump, baffles upstanding from the bottom in each aeration tank adjacent to and extending above the passageways thereinto, and means supplying air in the aeration tanks at and on the inner sides of the baffles thereby mixing, aerating and circulating material therein and concurrently causing flow through said sump from the settling tank to the aeration tanks and through the passageways from the aeration tanks to the settling tank.

5. Sewage treatment apparatus comprising a unitary tank structure having adjacent aeration and settling chambers, means to supply liquid sewage to the aeration tank, a sump in the middle portion of the bottom of the settling tank having passageways leading to the aeration tank, mechanical scraper means moving settled sludge on the bottom of the settling tank from the lateral walls to the sump, a baffle upstanding an extending upwardly from the bottom of the aeration chamber adjacent to and of greater heighth than the opening of the passageway thereinto and means supplying air in the aeration tank mixing, aerating and circulating material therein and concurrently causing flow through said sump from the settling tank to the aeration tank and through the passageways from the aeration tank to the settling tank.

6. Sewage treatment and like apparatus comprising adjacent aeration and settling chambers, a liquid flow passage from the aeration chamber to the settling chamber, a passageway from the settling chamber to the aeration chamber, aeration and diffused air supply means in the aeration chamber adjacent to the passageway, and baffle means extending upwardly from the bottom of the aeration chamber to a heighth substantially above the heighth of the passageway adjacent to the air supply means away from the passageway whereby the air is supplied between the passageway and said baffle means creating a positive air lift at said passageway causing flow from settling tank through said passageway into aeration tank.

7. Sewage treatment apparatus comprising an aeration chamber, an adjacent settling chamber, a liquid passage from the aeration chamber to the settling chamber at a location above the bottom thereof and below normal liquid level, a passageway from said settling chamber into said aeration chamber near the bottom thereof, a baffle in the aeration chamber projecting upwardly from the bottom thereof and extending above the heighth of the passageway, said baffle being spaced outwardly from the opening of the passageway, and an air supply means discharging air within the aeration chamber between the opening of the passageway and the inner side of the baffle thereby creating hydraulic differential adjacent to said baffle and through said passageway to create circulation drawing liquid from the settling chamber into the aeration chamber and to also aerate liquid within the aeration chamber.

STANLEY E. KAPPE.

REFERENCES CITED

The following references are of record in the file of this patent:

UNITED STATES PATENTS

| Number | Name | Date |
|---|---|---|
| 1,139,024 | Frank | May 11, 1915 |
| 1,646,478 | Elrod | Oct. 25, 1927 |
| 1,867,824 | Hammerly | July 19, 1932 |
| 1,900,809 | Hammerly | Mar. 7, 1933 |
| 1,902,078 | Jenks | Mar. 21, 1933 |
| 1,937,434 | Piatt | Nov. 28, 1933 |
| 2,024,345 | Elrod | Dec. 17, 1935 |
| 2,067,161 | Durdin | Jan. 5, 1937 |
| 2,144,385 | Nordell | Jan. 17, 1939 |
| 2,144,386 | Nordell | Jan. 17, 1939 |
| 2,154,132 | Mallory | Apr. 11, 1939 |
| 2,374,772 | Nordell | May 1, 1945 |
| 2,400,598 | Prager | May 21, 1946 |
| 2,464,707 | Montgomery | Mar. 15, 1949 |

FOREIGN PATENTS

| Number | Country | Date |
|---|---|---|
| 105,654 | Great Britain | of 1917 |